United States Patent [19]
Andresen et al.

[11] Patent Number: 5,465,281
[45] Date of Patent: Nov. 7, 1995

[54] INSULATED PROTECTIVE COATING FOR MITIGATION OF STRESS CORROSION CRACKING OF METAL COMPONENTS IN HIGH-TEMPERATURE WATER

[75] Inventors: Peter L. Andresen, Schenectady; Young J. Kim, Clifton Park, both of N.Y.

[73] Assignee: General Electric Company, San Jose, Calif.

[21] Appl. No.: 226,153

[22] Filed: Apr. 11, 1994

[51] Int. Cl.[6] ................................ G21C 9/00
[52] U.S. Cl. ............... 376/305; 376/249; 376/425; 376/414; 376/256
[58] Field of Search ................ 376/305, 249, 376/425, 414, 256; 427/207.1

[56] References Cited

U.S. PATENT DOCUMENTS

| | | | |
|---|---|---|---|
| 3,880,585 | 4/1975 | Hess et al. | 21/2.7 R |
| 4,262,247 | 4/1981 | Olson et al. | 324/65 CR |
| 4,267,210 | 5/1981 | Yajima et al. | 427/226 |
| 4,624,402 | 11/1986 | Pitcairn et al. | 228/119 |
| 4,672,007 | 6/1987 | Teng et al. | 428/624 |
| 4,702,880 | 10/1987 | Porowski et al. | 376/305 |
| 4,877,705 | 10/1989 | Polidor | 428/34.6 |
| 5,118,913 | 6/1992 | Taylor | 204/435 |
| 5,130,081 | 7/1992 | Niedrach | 376/305 |
| 5,135,709 | 8/1992 | Andresen et al. | 376/305 |
| 5,323,429 | 6/1994 | Roarty et al. | 376/249 |

Primary Examiner—Peter A. Nelson
Assistant Examiner—Meena Chelliah
Attorney, Agent, or Firm—James E. McGinness

[57] ABSTRACT

A method for mitigating crack initiation and propagation on the surface of metal components in a water-cooled nuclear reactor. An electrically insulating coating is applied on the surfaces of IGSCC-susceptible reactor components. The preferred electrically insulating material is yttria-stabilized zirconia. The presence of an electrically insulating coating on the surface of the metal components shifts the corrosion potential in the negative direction without the addition of hydrogen and in the absence of noble metal catalyst. Corrosion potentials $\leq -0.5$ $V_{she}$ can be achieved even at high oxidant concentrations and in the absence of hydrogen.

20 Claims, 8 Drawing Sheets

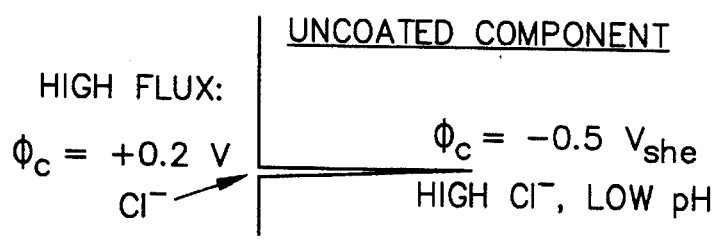
FIG. 9A
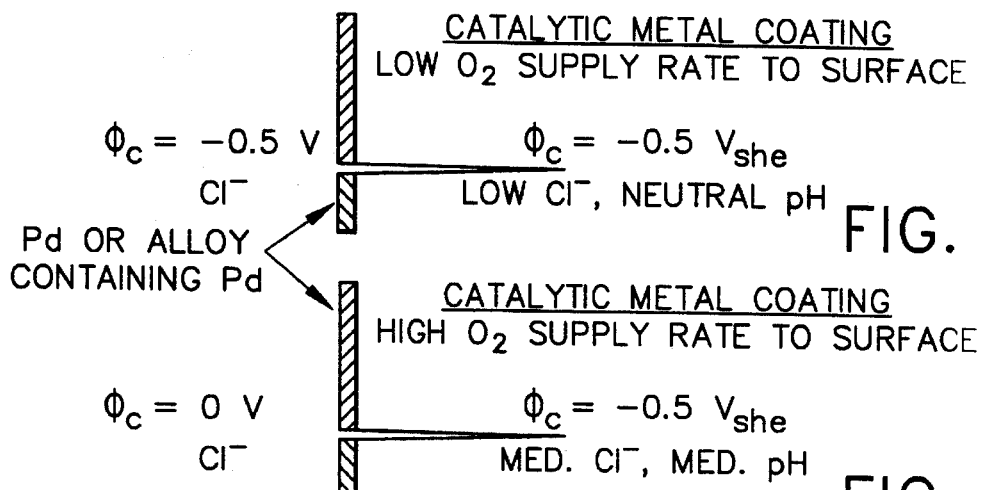
FIG. 9B
FIG. 9C
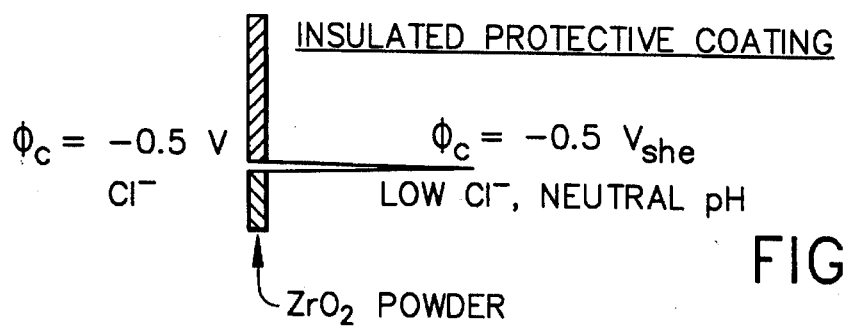
FIG. 9D
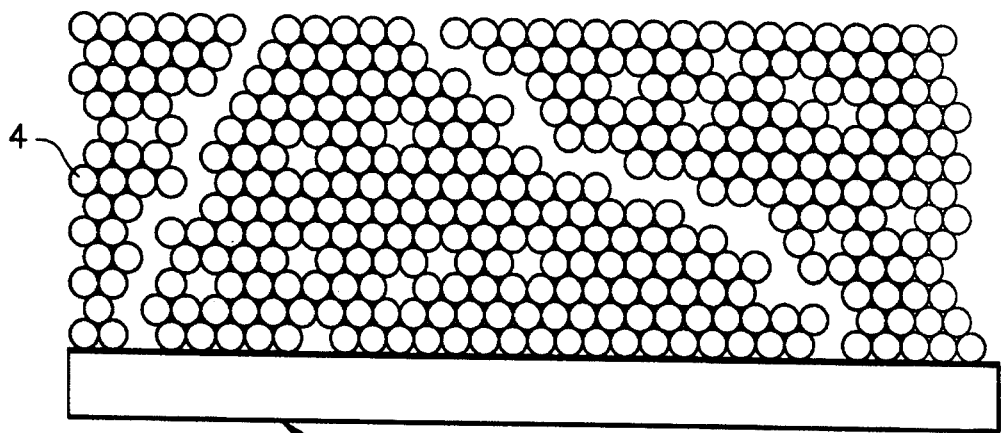
FIG. 10

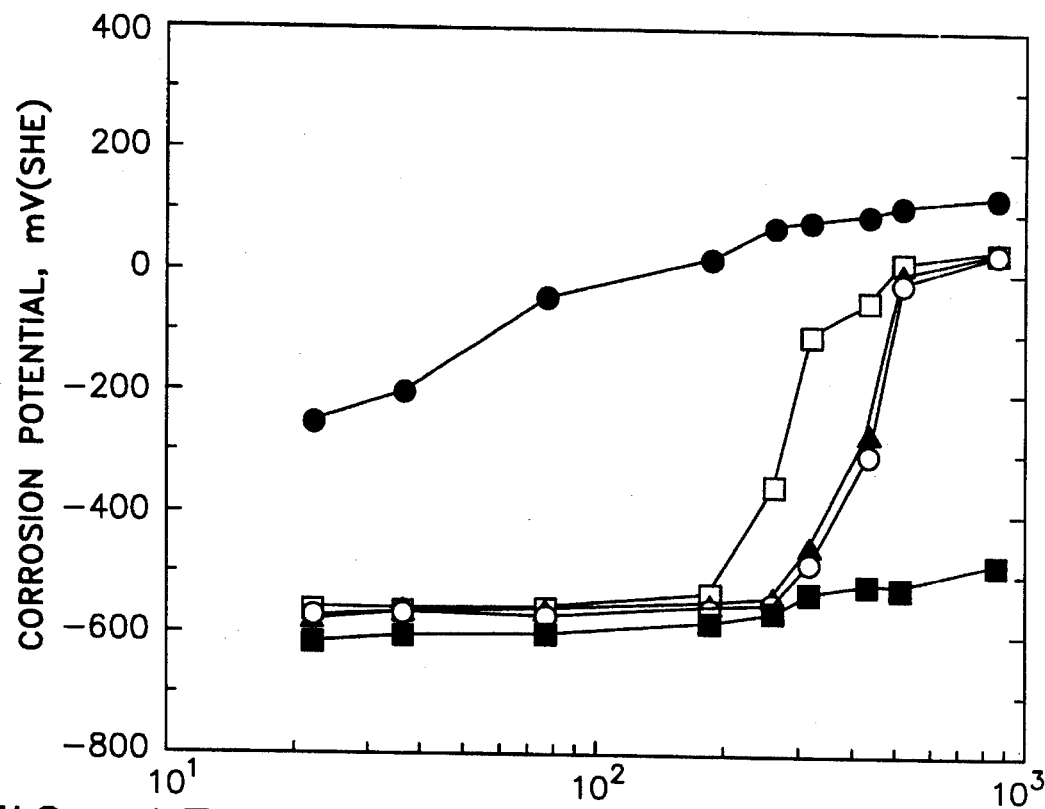
FIG. 13  OXYGEN CONCENTRATION IN WATER, ppb
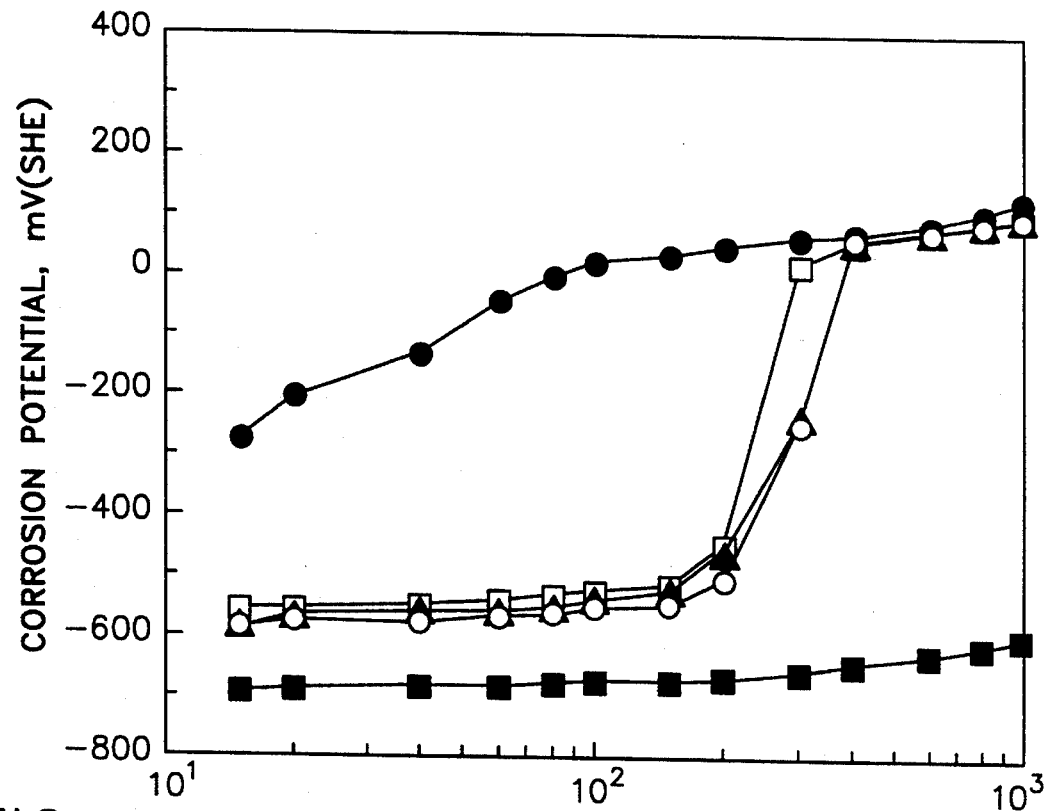
FIG. 14  OXYGEN CONCENTRATION IN WATER, ppb

INSULATED PROTECTIVE COATING FOR MITIGATION OF STRESS CORROSION CRACKING OF METAL COMPONENTS IN HIGH-TEMPERATURE WATER

FIELD OF THE INVENTION

Field of the Invention

This invention relates to reducing the corrosion potential of components exposed to high-temperature water. As used herein, the term "high-temperature water" means water having a temperature of about 100° C. or greater, steam, or the condensate thereof. High-temperature water can be found in a variety of known apparatus, such as water deaerators, nuclear reactors, and steam-driven power plants.

BACKGROUND OF THE INVENTION

Nuclear reactors are used in electric power generation, research and propulsion. A reactor pressure vessel contains the reactor coolant, i.e. water, which removes heat from the nuclear core. Respective piping circuits carry the heated water or steam to the steam generators or turbines and carry circulated water or feedwater back to the vessel. Operating pressures and temperatures for the reactor pressure vessel are about 7 MPa and 288° C. for a boiling water reactor (BWR), and about 15 MPa and 320° C. for a pressurized water reactor (PWR). The materials used in both BWRs and PWRs must withstand various loading, environmental and radiation conditions.

Some of the materials exposed to high-temperature water include carbon steel, alloy steel, stainless steel, and nickel-based, cobalt-based and zirconium-based alloys. Despite careful selection and treatment of these materials for use in water reactors, corrosion occurs on the materials exposed to the high-temperature water. Such corrosion contributes to a variety of problems, e.g., stress corrosion cracking, crevice corrosion, erosion corrosion, sticking of pressure relief valves and buildup of the gamma radiation-emitting Co-60 isotope.

Stress corrosion cracking (SCC) is a known phenomenon occurring in reactor components, such as structural members, piping, fasteners, and welds, exposed to high-temperature water. As used herein, SCC refers to cracking propagated by static or dynamic tensile stressing in combination with corrosion at the crack tip. The reactor components are subject to a variety of stresses associated with, e.g., differences in thermal expansion, the operating pressure needed for the containment of the reactor cooling water, and other sources such as residual stress from welding, cold working and other asymmetric metal treatments. In addition, water chemistry, welding, crevice geometry, heat treatment, and radiation can increase the susceptibility of the metal in a component to SCC.

It is well known that SCC occurs at higher rates when oxygen is present in the reactor water in concentrations of about 1 to 5 parts per billion (ppb) or greater. SCC is further increased in a high radiation flux where oxidizing species, such as oxygen, hydrogen peroxide, and short-lived radicals, are produced from radiolytic decomposition of the reactor water. Such oxidizing species increase the electrochemical corrosion potential (ECP) of metals. Electrochemical corrosion is caused by a flow of electrons from anodic to cathodic areas on metallic surfaces. The ECP is a measure of the thermodynamic tendency for corrosion phenomena to occur, and is a fundamental parameter in determining rates of, e.g., SCC, corrosion fatigue, corrosion film thickening, and general corrosion.

Corrosion potential has been clearly shown to be a primary variable in controlling the susceptibility to SCC in BWR environments. FIG. 1 shows the observed and predicted crack growth rate as a function of corrosion potential for furnace-sensitized Type 304 stainless steel at 27.5 to 30 MPa√m in 288° C. water over the range of solution conductivities from 0.1 to 0.5 µS/cm. Data points at elevated corrosion potentials and growth rates correspond to irradiated water chemistry conditions in test or commercial reactors.

Corrosion (or mixed) potential represents a kinetic balance of various oxidation and reduction reactions on a metal surface placed in an electrolyte, and can be decreased by reducing the concentration of oxidants such as dissolved oxygen. FIG. 2 is a schematic of E (potential) vs. log |i| (absolute value of current density) curves showing the interaction of $H_2$ and $O_2$ on a catalytically active surface such as platinum or palladium. $i_0$ is the exchange current density, which is a measure of the reversibility of the reaction. Above $i_0$, activation polarization (Tafel behavior) is shown in the sloped, linear regions. $i_L$ represents the limited current densities for oxygen diffusion to the metal surface, which vary with mass transport rate (e.g., oxygen concentration, temperature, and convection). The corrosion potential in high-temperature water containing oxygen and hydrogen is usually controlled by the intersection of the $O_2$ reduction curve ($O_2+2H_2O+4e^- \rightarrow 4OH^-$) with the $H_2$ oxidation curve ($H_2 \rightarrow 2H^+ +2e^-$), with the low kinetics of metal dissolution generally having only a small role.

The fundamental importance of corrosion potential versus, e.g., the dissolved oxygen concentration per se, is shown in FIG. 3, where the crack growth rate of a Pd-coated CT specimen drops dramatically once excess hydrogen conditions are achieved, despite the presence of a relatively high oxygen concentration. FIG. 2 is a plot of crack length vs. time for a Pd-coated CT specimen of sensitized Type 304 stainless steel showing accelerated crack growth at ≈0.1 µM $H_2SO_4$ in 288° C. water containing about 400 ppb oxygen. Because the CT specimen was Pd-coated, the change to excess hydrogen caused the corrosion potential and crack growth rate to drop.

In a BWR, the radiolysis of the primary water coolant in the reactor core causes the net decomposition of a small fraction of the water to the chemical products $H_2$, $H_2O_2$, $O_2$ and oxidizing and reducing radicals. For steady-state operating conditions, approximately equilibrium concentrations are established for $O_2$, $H_2O_2$, and $H_2$ in the water which is recirculated and for $O_2$ and $H_2$ in the steam going to the turbine. These concentrations of $O_2$, $H_2O_2$, and $H_2$ are oxidizing and result in conditions that can promote intergranular stress corrosion cracking (IGSCC) of susceptible materials of construction. One method employed to mitigate IGSCC of susceptible material is the application of hydrogen water chemistry (HWC), whereby the oxidizing nature of the BWR environment is modified to a more reducing condition. This effect is achieved by adding hydrogen gas to the reactor feedwater. When the hydrogen reaches the reactor vessel, it reacts with the radiolytically formed oxidizing species homogeneously and on metal surfaces to reform water, thereby lowering the concentration of dissolved oxidizing species in the water in the vicinity of metal surfaces. The rate of these recombination reactions is dependent on local radiation fields, water flow rates and other variables.

The injected hydrogen reduces the level of oxidizing species in the water, such as dissolved oxygen, and as a result lowers the ECP of metals in the water. However, factors such as variations in water flow rates and the time or intensity of exposure to neutron or gamma radiation result in the production of oxidizing species at different levels in different reactors. Thus, varying amounts of hydrogen have been required to reduce the level of oxidizing species sufficiently to maintain the ECP below a critical potential required for protection from IGSCC in high-temperature water. As used herein, the term "critical potential" means a corrosion potential at or below a range of values of about −0.230 to −0.300 V based on the standard hydrogen electrode (SHE) scale. IGSCC proceeds at an accelerated rate in systems in which the ECP is above the critical potential, and at a substantially lower or zero rate in systems in which the ECP is below the critical potential (see FIG. 1). Water containing oxidizing species such as oxygen increases the ECP of metals exposed to the water above the critical potential, whereas water with little or no oxidizing species present results in an ECP below the critical potential.

Initial approaches to reduce the corrosion potential focused on relatively large additions of dissolved hydrogen, which proved capable of reducing the dissolved oxygen concentration in the water outside of the core from ≈200 ppb to <5 ppb, with a resulting change in corrosion potential from ≈+0.05 $V_{she}$ to ≦−0.25 $V_{she}$. This approach is termed hydrogen water chemistry, and is in commercial use in domestic and overseas BWRs. Corrosion potentials of stainless steels and other structural materials in contact with reactor water containing oxidizing species can usually be reduced below the critical potential by injection of hydrogen into the feedwater. For adequate feedwater hydrogen addition rates, conditions necessary to inhibit IGSCC can be established in certain locations of the reactor. Different locations in the reactor system require different levels of hydrogen addition. Much higher hydrogen injection levels are necessary to reduce the ECP within the high radiation flux of the reactor core, or when oxidizing cationic impurities, e.g., cupric ion, are present.

It has been shown that IGSCC of Type 304 stainless steel (containing 18–20% Cr, 8–10.5% Ni and 2% Mn) and all other structural materials used in BWRs can be mitigated by reducing the ECP of the stainless steel to values below −0.230 V(SHE). An effective method of achieving this objective is to use HWC. However, high hydrogen additions, e.g., of about 200 ppb or greater in the reactor water, that may be required to reduce the ECP below the critical potential, can result in a higher radiation level in the steam-driven turbine section from incorporation of the short-lived $N^{16}$ species in the steam. For most BWRs, the amount of hydrogen addition required to provide mitigation of IGSCC of pressure vessel internal components results in an increase in the main steam line radiation monitor by a factor of five to eight. This increase in main steam line radiation can cause high, even unacceptable, environmental dose rates that can require expensive investments in shielding and radiation exposure control. Thus, recent investigations have focused on using minimum levels of hydrogen to achieve the benefits of HWC with minimum increase in the main steam radiation dose rates.

An effective approach to achieve this goal is to either coat or alloy the stainless steel surface with palladium or other noble metals. The presence of palladium on the stainless steel surface reduces the hydrogen demand to reach the required IGSCC critical potential of −0.230 V(SHE). The use of alloys or metal coatings containing noble metals permits lower corrosion potentials (e.g., ≈−0.5 $V_{she}$) to be achieved at much lower hydrogen addition rates. For example, U.S. Pat. No. 5,135,709 to Andresen et al. discloses a method for lowering the ECP on components formed from carbon steel, alloy steel, stainless steel, nickel-based alloys or cobalt-based alloys which are exposed to high-temperature water by forming the component to have a catalytic layer of a noble metal. Such approaches rely on the very efficient recombination kinetics of dissolved oxygen and hydrogen on catalytic surfaces (see the high $i_o$ for $H_2$ oxidation in FIG. 2, which causes most $O_2$ reduction curves to intersect at −0.5 $V_{she}$). This was demonstrated not only for pure noble metals and coatings, but also for very dilute alloys or metal coatings containing, e.g., <0.1 wt. % Pt or Pd (see FIGS. 3 to 5). FIG. 4 shows corrosion potential measurements on pure platinum, Type 304 stainless steel and Type 304 stainless steel thermally sprayed by the hyper velocity oxy-fuel (HVOF) technique with a powder of Type 308L stainless steel containing 0.1 wt. % palladium. Data were obtained in 285° C. water containing 200 ppb oxygen and varying amounts of hydrogen. The potential drops dramatically to its thermodynamic limit of ≈−0.5 $V_{she}$ once the hydrogen is near or above the stoichiometric value associated with recombination with oxygen to form water ($2H_2+O_2 \rightarrow 2H_2O$). FIG. 5 shows corrosion potentials of Type 304 stainless steel doped with 0.35 wt. % palladium at a flow rate of 200 cc/min. in 288° C. water containing up to 5000 ppb oxygen and various amounts of hydrogen.

If the surface recombination rate is much higher than the rate of supply of oxidants to the metal surface (through the stagnant, near-surface boundary layer of water), then the concentration of oxidants (at the surface) becomes very low and the corrosion potential drops to its thermodynamic limit of ≈−0.5 $V_{she}$ in 288° C. water, even though the bulk concentration of dissolved oxygen remains high (FIGS. 3 to 5). Further, the somewhat higher diffusion rate of dissolved hydrogen versus dissolved oxygen through the boundary layer of water permits somewhat substoichiometric bulk concentrations of hydrogen to support full recombination of the oxidant which arrives at the metal surface. While some hydrogen addition to BWRs will still be necessary with this approach, the addition can be vastly lower than (as low as ≦1% of) that required for the initial hydrogen water chemistry concept. Hydrogen additions remain necessary since, while oxidants (primarily oxygen and hydrogen peroxide) and reductants (primarily hydrogen) are produced by radiolysis in stoichiometric balance, hydrogen preferentially partitions to the steam phase in a BWR. Also, no hydrogen peroxide goes into the steam. Thus, in BWR recirculation water there is some excess of oxygen relative to hydrogen, and then, in addition, a fairly large concentration of hydrogen peroxide (e.g., ≈200 ppb). Approaches designed to catalytically decompose the hydrogen peroxide before or during steam separation (above the core) have also been identified.

While the noble metal approach works very well under many conditions, both laboratory data and in-core measurements on noble metals show that it is possible for the oxidant supply rate to the metal surface to approach and/or exceed the recombination rate (see FIGS. 6 and 7). FIG. 6 shows the effect of feedwater hydrogen addition on the corrosion potential of stainless steel and platinum at several locations at the Duane Arnold BWR. At ≈2 SCFM of feedwater hydrogen addition, the corrosion potentials in the recirculation piping drop below ≈−0.25 $V_{she}$. However, in the high flux (top of core) regions, even for pure Pt, the corrosion potential remains above ≈−0.25 $V_{she}$ at feedwater hydrogen levels of ≧15 scfm, where long-term operation is very unattractive due to the cost of hydrogen and the increase in volatile $N^{16}$ (turbine shine). FIG. 7 shows corrosion potential vs. hydrogen addition for Pd-coated Type 316 stainless steel in 288° C. water in a rotating cylinder specimen, which simulates high fluid flow rate conditions. The water contained 1.0 parts per million (ppm) $O_2$. As the hydrogen level was increased above stoichiometry, the potential decreased, but only to about −0.20 $V_{she}$. The oxygen supply rate in these tests had exceeded the exchange current density ($i_o$) of the hydrogen reaction (see FIG. 2), and activation polarization (Tafel response) of the hydrogen reaction began to occur, causing a shift to a mixed (or corrosion) potential which is in between the potentials measured in normal and extreme hydrogen water chemistry on noncatalytic surfaces.

At the point where the oxidant supply rate to the metal surface approaches and/or exceeds the recombination rate, the corrosion potential will rapidly increase by several hundred millivolts (e.g., to $\geq$−0.2 $V_{she}$). Indeed, even under (relatively small) excess hydrogen conditions, pure platinum electrodes in the core of BWRs exhibit corrosion potentials which are quite high, although still somewhat lower than (noncatalytic) stainless steel (see FIG. 6). At very high hydrogen levels (well above those typically used in the original hydrogen water chemistry concept), the corrosion potential on noble metal surfaces will drop to <−0.3 $V_{she}$ (see FIG. 6). However, the huge cost of the hydrogen additions combined with large observed increase in volatile radioactive nitrogen in the steam (i.e., $N^{16}$, which can raise the radiation levels in the turbine building) make the use of very high hydrogen addition rates unpalatable.

SUMMARY OF THE INVENTION

The present invention is an alternative method for achieving the objective of low ECPs which result in slow or no crack growth in stainless steel and other metals. This is accomplished by coating the surfaces of IGSCC-susceptible reactor components with an electrically insulating material such as zirconia. In accordance with the present invention, the metal corrosion potential is shifted in the negative direction without the addition of hydrogen and in the absence of noble metal catalyst.

BRIEF DESCRIPTION OF THE DRAWINGS

FIGS. 9A to 9D provide a schematic comparison of the corrosion potentials $\phi_c$ which form under high radiation flux on various coated and uncoated components.

FIG. 10 is a schematic of an insulated protective coating, depicted as thermally sprayed zirconia powder.

FIGS. 13 and 14 are plots showing the corrosion potential versus oxygen concentration for uncoated Type 304 stainless steel (●); Type 304 stainless steel coated with yttria-stabilized zirconia with thicknesses of 3 mils (□), 5 mils (▲) and 10 mils (○); and pure zirconium (■) after being immersed in pure water for 2 days and in water containing various water chemistry conditions for 3 months, respectively.

DETAILED DESCRIPTION OF THE PREFERRED EMBODIMENTS

The present invention is a technique for solving the problem of achieving low corrosion potentials in the high-flux, in-core region (or in other regions which may have very high oxidant supply rates from high concentrations and/or high fluid flow rates/convection). The technique entails the formation of an electrically insulating protective coating on SCC-susceptible surfaces of metal components of a water-cooled nuclear reactor. The insulated protective coating is designed to alter the balance between the rate of supply of oxidants to the surface and the rate of recombination on the surface by limiting the supply kinetics (by restricting the mass transport of reactants through a porous, insulated layer). The technique of the present invention is based on the following fundamental considerations.

The first consideration is that corrosion potentials are created only at metal-water interfaces. Thus, while on a metal coating the corrosion potential is formed at the interface of the metal coating with the bulk water, on a porous insulated coating, the corrosion potential is formed at the interface of the substrate metal and the water with which it is in contact (i.e., the water in the pores).

The influence of corrosion potential on stress corrosion cracking results from the difference in corrosion potential at the generally high potential crack mouth/free surface versus the always low potential (e.g., −0.5 $V_{she}$) within the crack/crevice tip. This potential difference causes electron flow in the metal and ionic flow in the solution, which induces an increase in the anion concentration in the crack.

Figure 8:
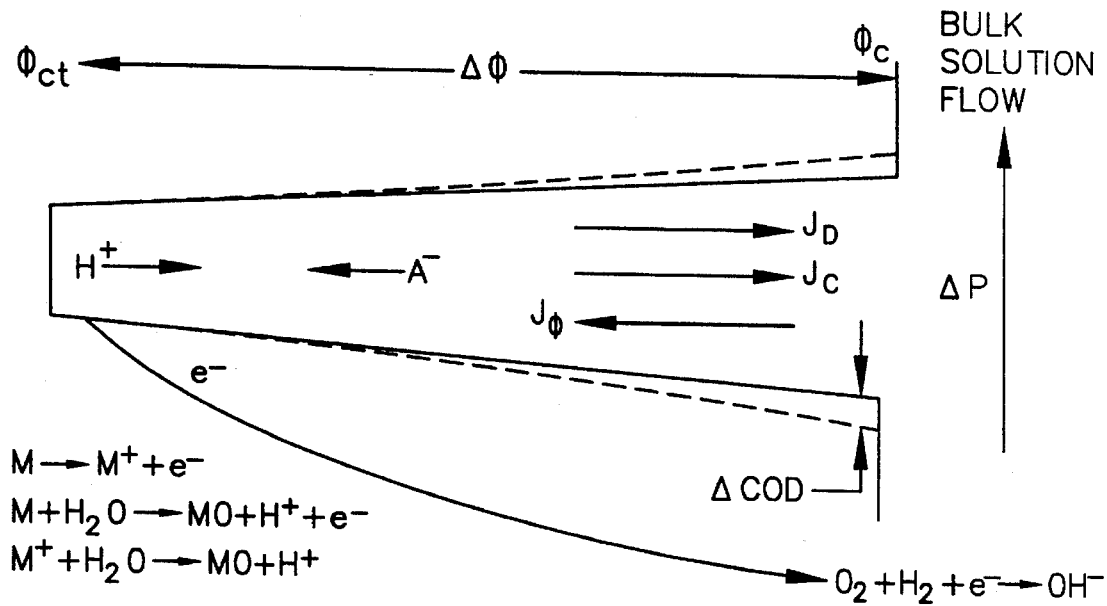
FIG. 8 is a schematic of electrochemical processes which generally lead to elevated corrosion potentials on the outside (mouth) of a crack and low corrosion potentials in the inside (tip) of the crack.

FIG. 8 is a schematic of electrochemical processes which generally lead to elevated corrosion potentials on the outside (mouth) of a crack and low corrosion potentials in the inside (tip) of the crack. The potential difference $\Delta\phi_c$ causes anions $A^-$ (e.g., $Cl^-$) to concentrate in the crack, but only if there is both an ionic path and an electron path.

FIGS. 9A to 9D provide a schematic comparison of the corrosion potentials $\phi_c$ which form under high radiation flux: (A) on an uncoated (e.g., stainless steel) component (high $\phi_c$); (B) on a component coated with a catalytic metal coating where the rate of supply of reactants to the surface is not too rapid (low $\phi_c$); (C) on a component coated with a catalytic metal coating where the rate of supply of reactants to the surface approaches or exceeds the $H_2$—$O_2$ recombination kinetics (moderate $\phi_c$); and (D) on a component coated with an insulated protective coating (always at a low corrosion potential).

Thus, to influence stress corrosion cracking, the elevated crack mouth corrosion potential must form on a surface that is in electrical contact with the component of interest. If an insulating coating (see FIGS. 9 and 10) were applied to a metal component and some porosity or cracking in the coating is assumed to exist, the corrosion potential would be formed only at the metal component-water interface.

Thus, a crevice would be formed by the coating, but since it is electrically insulating, the crevice cannot represent an "electrochemical" crevice, but only a "restricted mass transport" geometry. The critical ingredient in "electrochemical" crevices is the presence of a conducting material in simultaneous contact with regions of high potential (e.g., a crack mouth) and regions of low potential (e.g., a crack tip). Thus, it would not help to have a component covered by an insulating layer, which layer is in turn covered by a metal layer (or interconnected metal particles) within which exists a crevice or crack. Under these conditions, the aggressive crevice chemistry could form in the outer metal layer, which in turn would be in contact with the component.

The second consideration is that if the insulated coating is impermeable to water, then obviously there can be neither corrosion potential formed on the underlying metal nor concern for stress corrosion cracking. Any pores or fine cracks in an insulating layer provide highly restricted mass transport and thus are equivalent to a very thick near-surface boundary layer of stagnant water. Since oxidants are always being consumed at metal surfaces, this very restricted mass transport (reduced rate of oxidant supply) causes the arrival rate of oxidants through the insulated coating to the substrate to decrease below the rate of their consumption. Under these mass transport limiting circumstances, the corrosion potential rapidly decreases to values $\leq -0.5$ $V_{she}$, even for high oxidant concentrations and in the absence of stoichiometric excess hydrogen (or any hydrogen). Numerous observations consistent with this have been made, including low potentials on stainless steel surfaces at low oxygen levels (e.g., 1 to 10 ppb), as well as in (just inside) crevices/cracks, even at very high oxygen levels.

Thus, corrosion potentials $-0.5$ $V_{she}$ can be achieved even at high oxidant concentrations and, not only in the absence of stoichiometric excess hydrogen, but also in the absence of any hydrogen. This may prove to be a critical invention for BWR plants which are unable (because of cost or because of the high $N^{16}$ radiation levels from hydrogen addition) to add sufficient hydrogen to guarantee stoichiometric excess hydrogen conditions at all locations in their plant.

While various non-conducting materials could be used, zirconia ($ZrO_2$) is a good initial choice because it can be thermally sprayed and is very stable in high temperature water, both structurally (e.g., it is not prone to spalling and is not susceptible to environmentally assisted cracking) and chemically (e.g., it does not dissolve or react). Zirconia can be obtained in various particle sizes, so that there is flexibility in adjusting the thermal spray parameters. Alumina is also an option. The dissolution rate of alumina in 288° C. water is higher than that for zirconia, but is still very low. Additions of other oxides into the coating may also be advantageous. For example, ZnO has been shown to yield many benefits in BWRs, including reduced incorporation of $Co^{60}$ in films (thereby lowering the radiation level, e.g., in piping) and reduced susceptibility to SCC.

Figure 1:
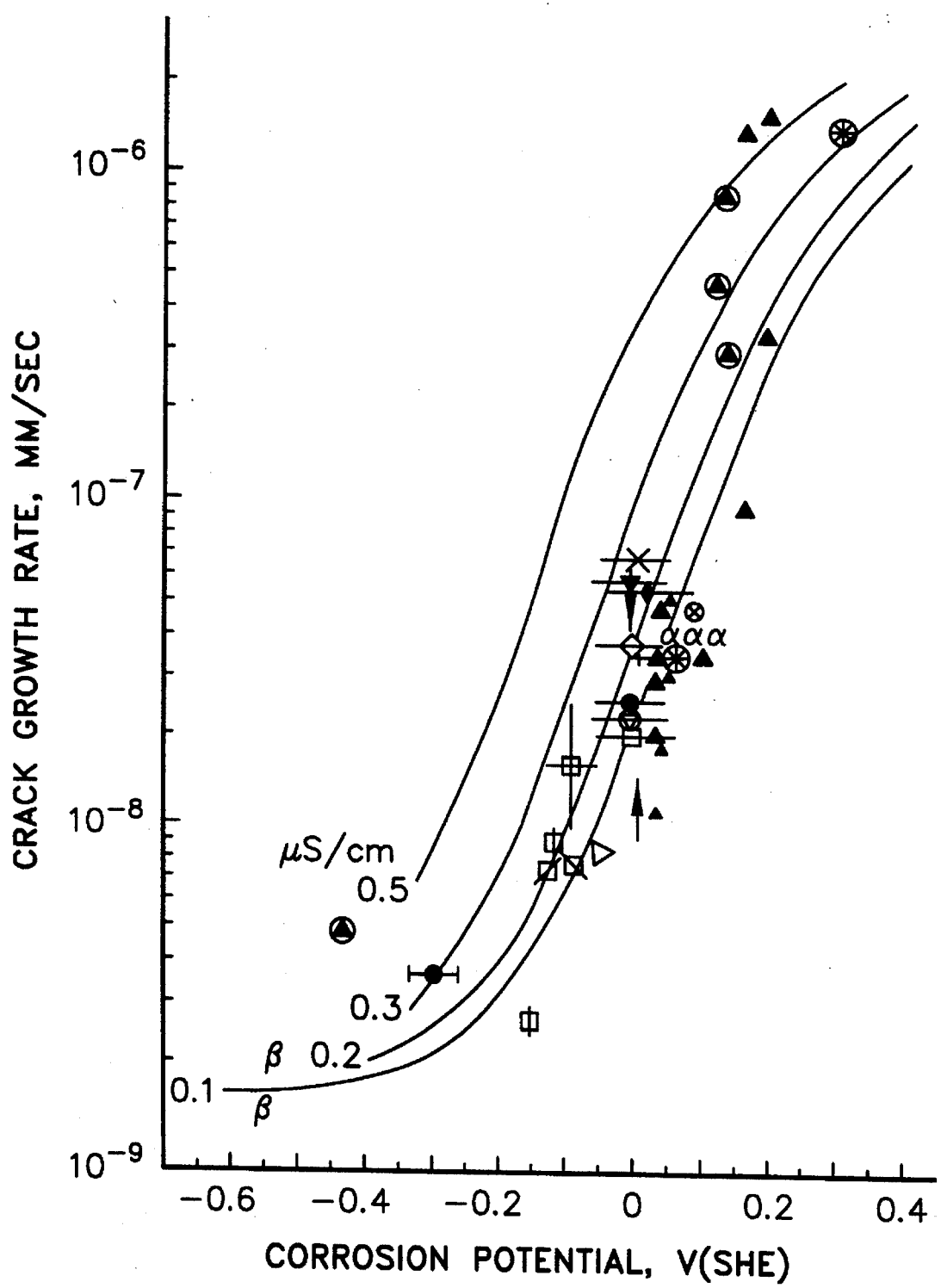
FIG. 1 shows the observed and predicted crack growth rate as a function of corrosion potential for furnace-sensitized Type 304 stainless steel in 288° C. water.
Figure 2:
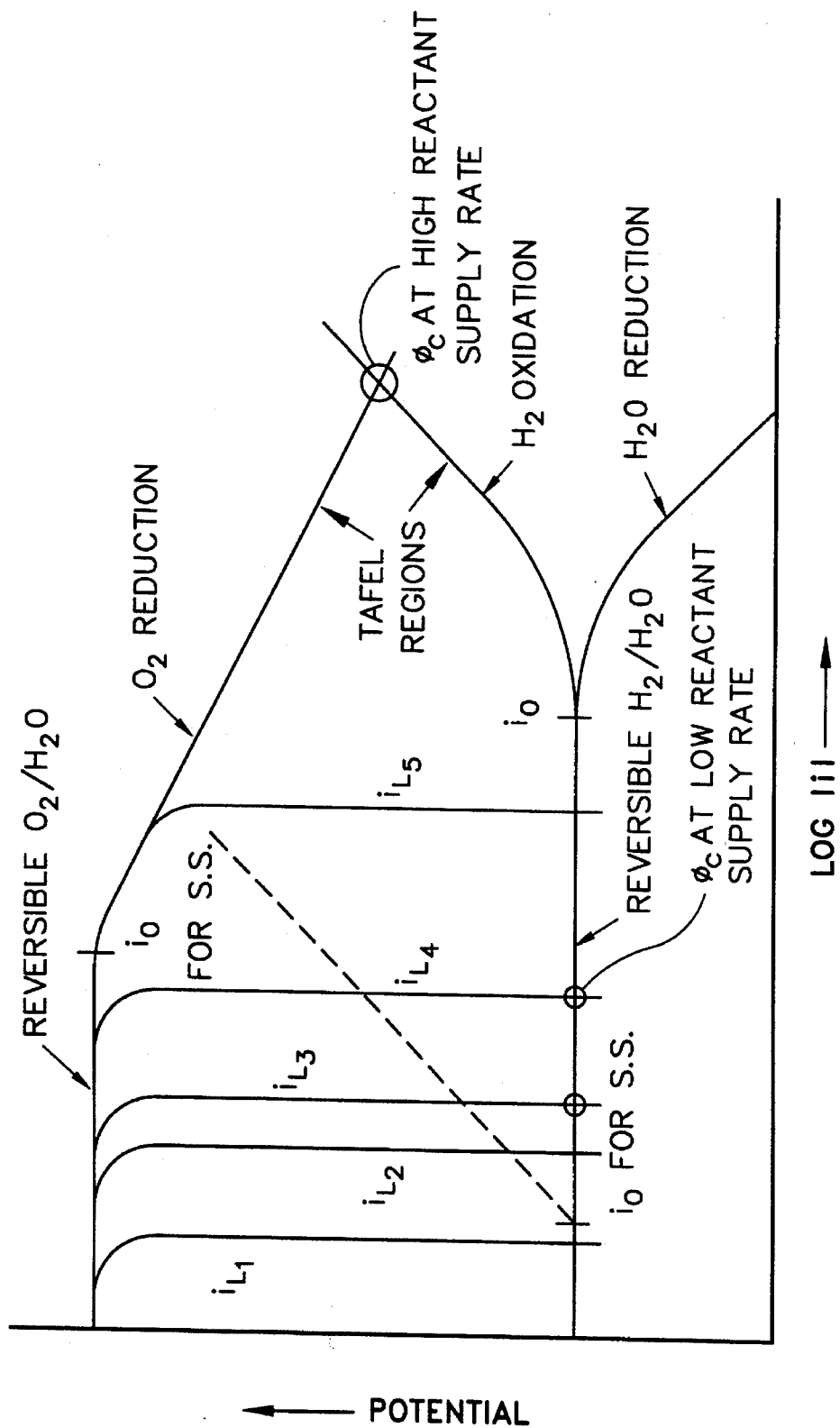
FIG. 2 is a schematic of E (potential) vs. log i (absolute value of current density) curves showing the interaction of $H_2$ and $O_2$ on a catalytically active surface such as platinum or palladium.
Figure 3:
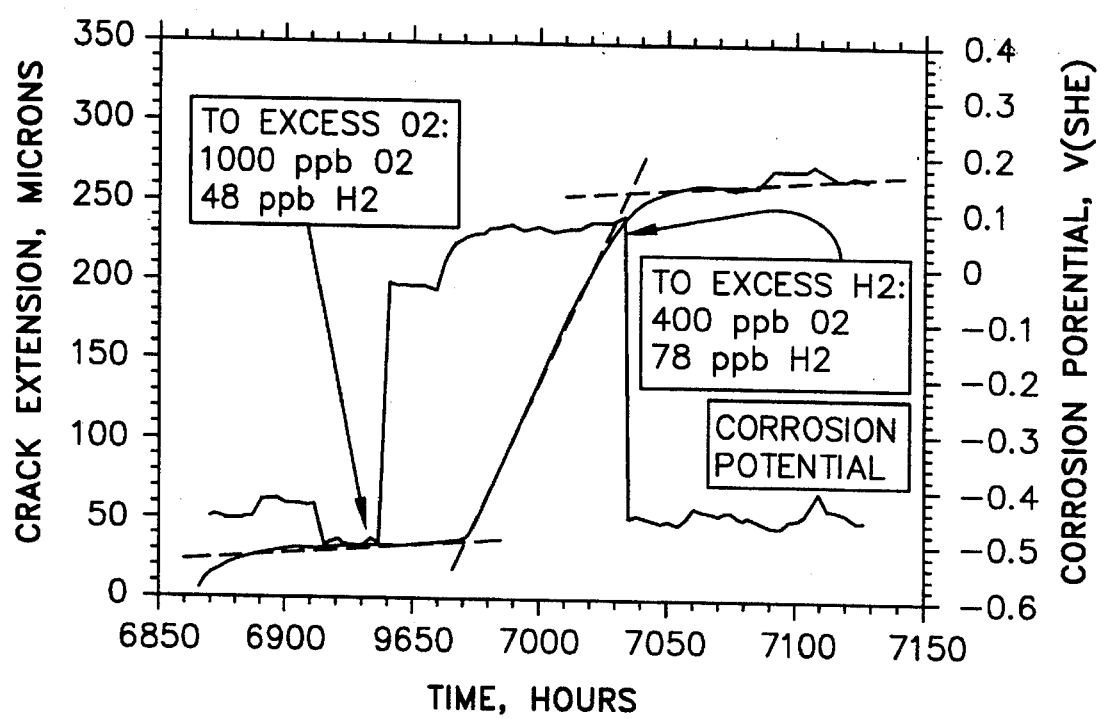
FIG. 3 is a plot of crack length vs. time for a Pd-coated CT specimen of sensitized Type 304 stainless steel in 288° C. water containing about 400 ppb oxygen and 0.1 μM $H_2SO_4$.
Figure 4:
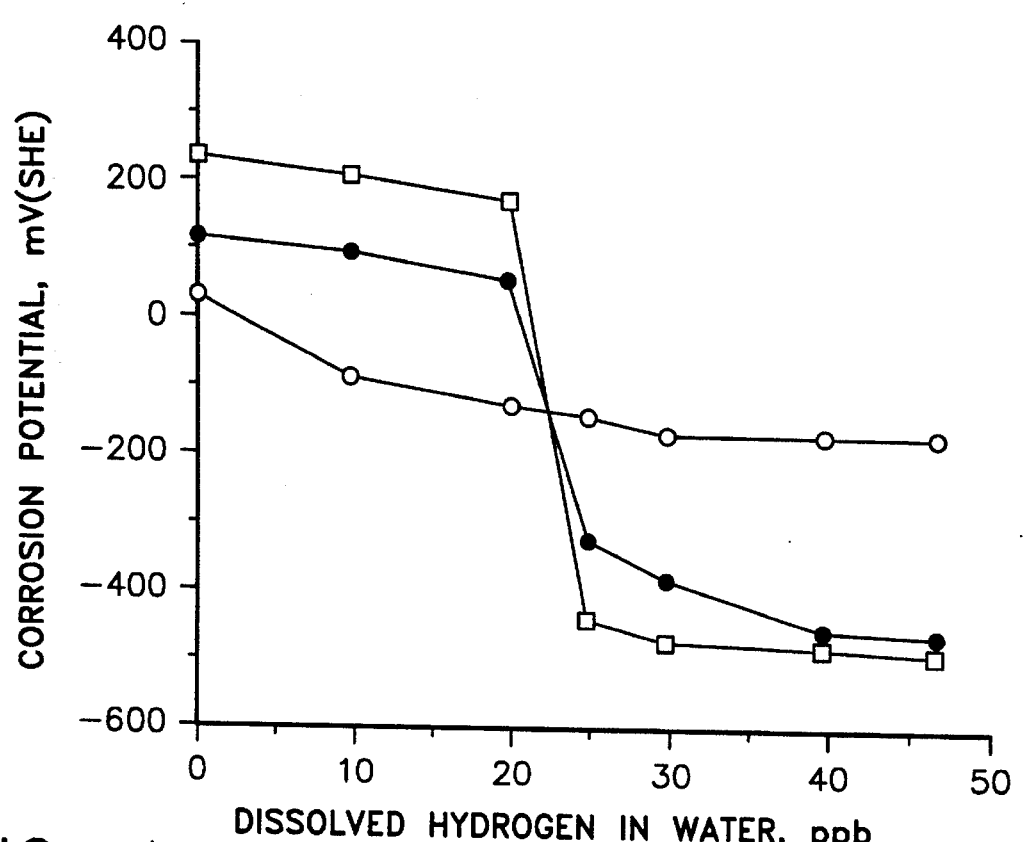
FIG. 4 is a graph showing corrosion potentials of pure platinum (□), Type 304 stainless steel (○) and Type 304 stainless steel thermally sprayed by the hyper velocity oxy-fuel (HVOF) technique with a powder of Type 308L stainless steel containing 0.1 wt. % palladium (●).
Figure 5:
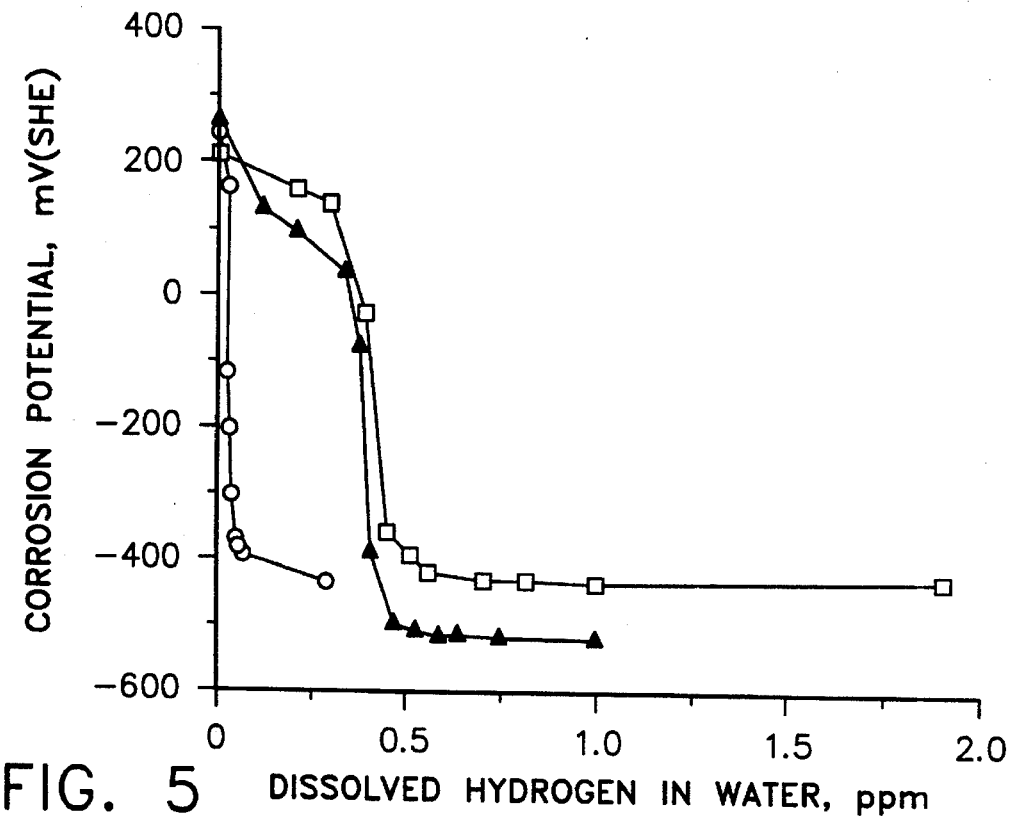
FIG. 5 is a graph showing corrosion potentials of Type 304 stainless steel doped with 0.35 wt. % palladium at a flow rate of 200 cc/min. in 288° C. water containing various amounts of hydrogen and the following amounts of oxygen: (○) 350 ppb; (▲) 2.5 ppm; and (□) 5.0 ppm.
Figure 6:
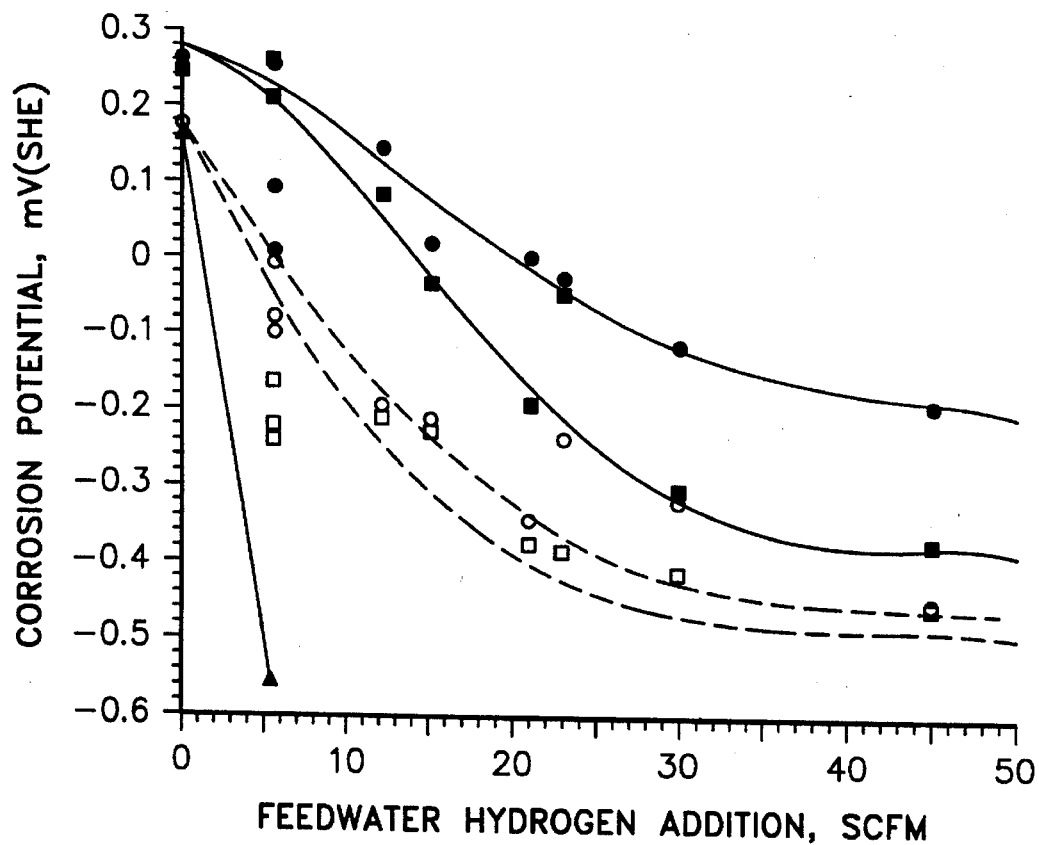
FIG. 6 is a graph showing the effect of feedwater hydrogen addition on the corrosion potential of Type 304 stainless steel at the top of the core (●), at the bottom of the core (■), and in the recirculation piping (▲); and of platinum at the top (○) and bottom (□) of the core.
Figure 7:
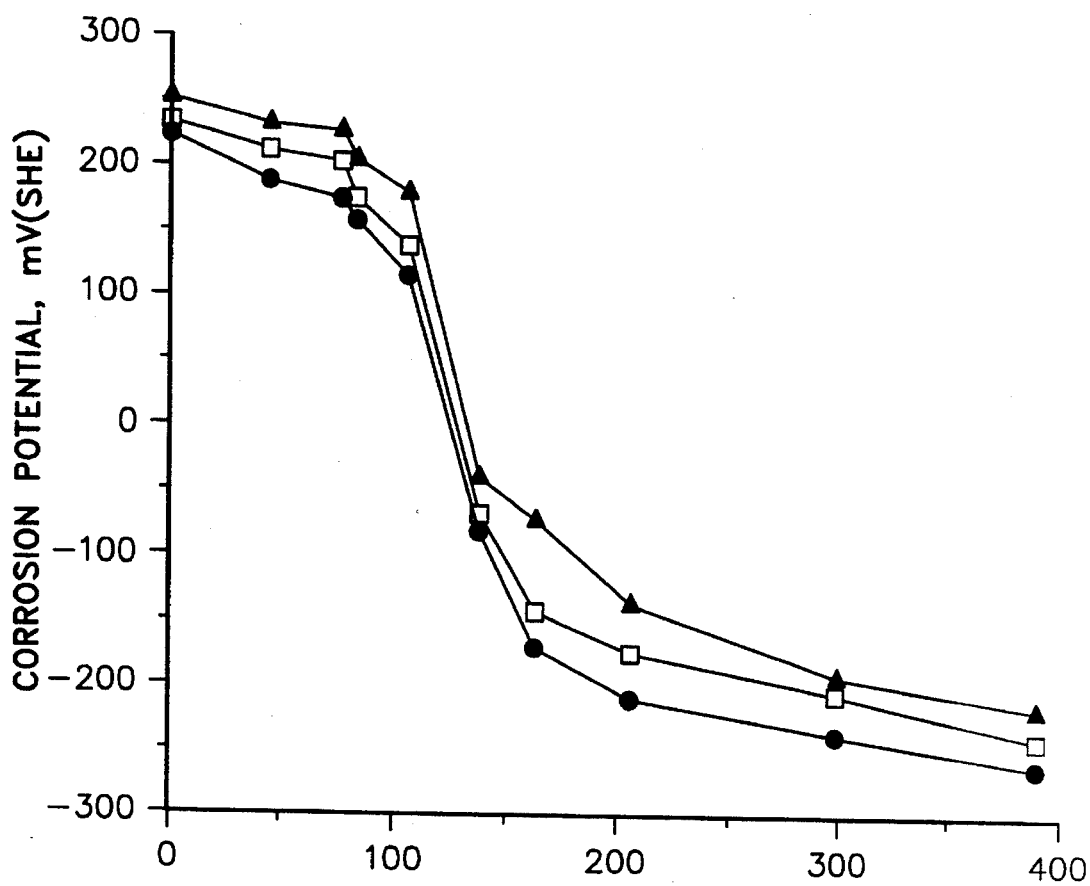
FIG. 7 is a graph showing corrosion potential vs. hydrogen addition for Pd-coated Type 316 stainless steel in 288° C. water in a rotating cylinder specimen, which simulates high fluid flow rate conditions of 0.3 (●), 1.5 (□) and 3.0 (▲) m/sec.

FIG. 10 is a schematic of an insulated protective coating, depicted as particles 4 of zirconia powder which have been thermally sprayed on a metal component surface 2. Due to the insulating nature of zirconia, there is no electrical connection between external (high oxidant) water and the metal component substrate. Thus, the insulated protective coating prevents an electrochemical crevice cell from being formed (see FIG. 8), while restricting mass transport of oxidants to the underlying metal substrate (see FIGS. 2 and 7) to sufficiently low rates such that the corrosion potential of the metal component is always low (i.e., $-0.5$ $V_{she}$).

Figure 11:
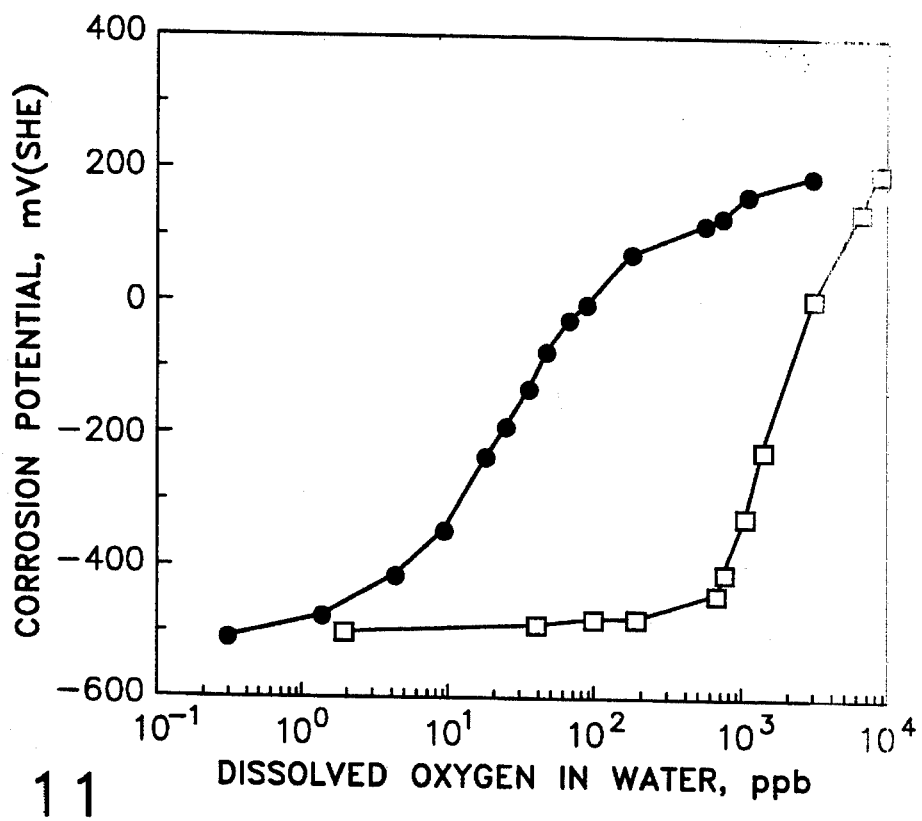
FIGS. 11 and 12 are plots showing the corrosion potential of Type 304 stainless steel uncoated (●) and coated (□) with yttria-stabilized zirconia by air plasma spraying versus oxygen and hydrogen peroxide concentration respectively.

Preliminary experimental data (shown in FIG. 11) were obtained in 288° C. pure water on a cylindrical stainless steel electrode coated with yttria-stabilized zirconia (YSZ) by air plasma spraying. A $Cu/Cu_2O$ membrane reference electrode was used to measure the corrosion potentials of the stainless steel autoclave, a platinum wire and the YSZ-coated stainless steel specimen. At oxygen concentrations up to $\approx 1$ ppm (during BWR operation, the equivalent oxygen concentration ($O_2+0.5\times H_2O_2$) is about 100 to 600 ppb), the corrosion potential of the YSZ-coated specimen remained at $\leq -0.5$ $V_{she}$ despite the high potentials registered on the stainless steel autoclave (+0.20 $V_{she}$) and the platinum electrode (+0.275 $V_{she}$). This is consistent with numerous observations of low potentials on stainless steel surfaces at low oxygen levels (e.g., 1 to 10 ppb) as well as inside crevices/cracks, even at very high oxygen levels.

Figure 12:
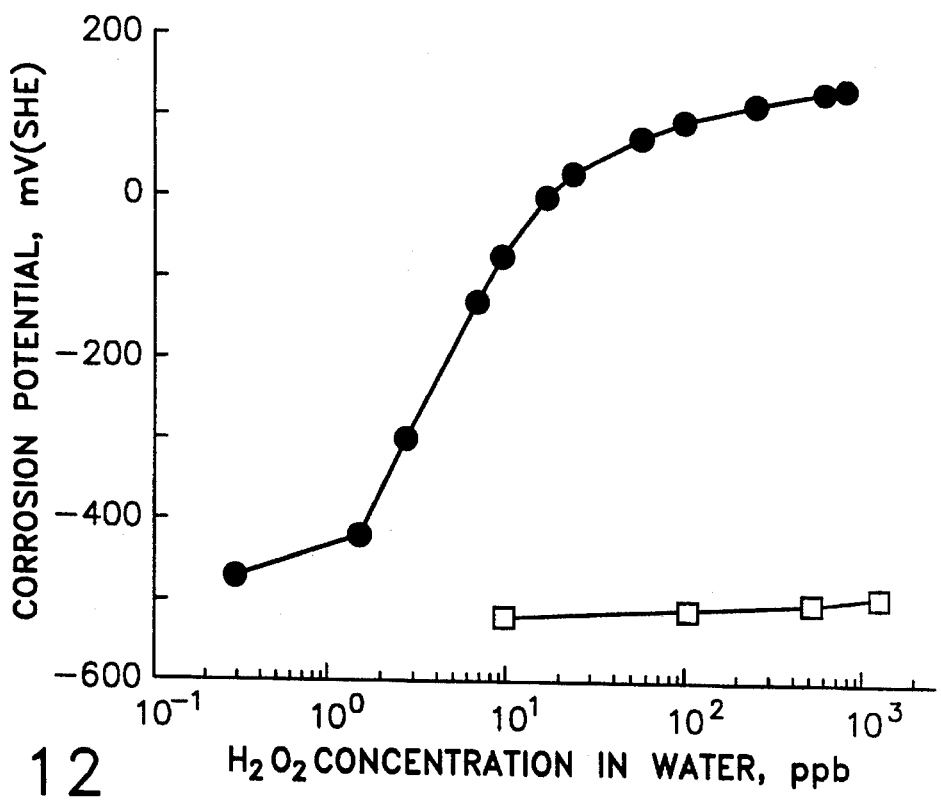

Similar observations were obtained in hydrogen peroxide, where low potentials were observed on the YSZ-coated specimen at concentrations above 1 ppm (see FIG. 12). By contrast, uncoated stainless steel exhibited a high corrosion potential of $\approx +0.150$ $V_{she}$. Low potentials were also observed on the YSZ-coated specimen in water containing 1 ppm $O_2$ when the specimen was rotated at 500 rpm, corresponding to 0.7 m/sec linear flow rate. This is not surprising, since the higher flow rates merely act to reduce the thickness of the stagnant boundary layer of liquid, a layer whose thickness is small relative to the zirconia coating. The success in maintaining low corrosion potentials under these conditions shows that the electrically insulating zirconia layer greatly reduces mass transport to the underlying metal surface such that, even in the absence of catalytic agents such as palladium, the cathodic (oxygen reduction) reaction is mass transport limited just as in uncoated specimens in solutions of very low dissolved oxygen content.

Further corroboration exists in the corrosion potential measurements on Zircaloy in 288° C. water, which apparently are always lower than $-0.5$ $V_{she}$, even in aerated solutions. The relatively highly electrically insulating nature of the zirconia film causes the corrosion potential to be formed at the metal surface where the oxidant concentration is very low due to its restricted transport through the zirconia film.

Additional experimental data is presented in FIGS. 13 and 14. A coating made of yttria-stabilized zirconia powder was deposited in three different thicknesses (3, 5 and 10 mils) on the fresh metal surface of Type 304 stainless steel (⅛ inch in diameter and 2 inches long) by air plasma spraying. The corrosion potentials of the zirconia-coated electrodes, a pure zirconium electrode and uncoated Type 304 stainless steel were measured against a $Cu/Cu_2O/ZrO_2$ reference electrode in 288° C. water containing various amounts of oxygen. After the corrosion potential measurement, test specimens were immersed in 288° C. water containing various water chemistry conditions for 3 months at open circuit.

In the initial tests, YSZ-coated stainless steel electrodes were mounted in the autoclave along with a zirconium electrode, an uncoated Type 304 stainless steel electrode and the reference electrode. All specimens were immersed in pure 288° C. water at a flow rate of 200 cc/min for 2 days. The corrosion potential was measured sequentially with incremental addition of oxygen, as shown in FIG. 13. At given oxygen levels up to 200–300 ppb, the YSZ-coated electrodes showed low potentials ($<-0.5$ $V_{she}$) essentially equivalent to those of the pure zirconium electrode, compared to the Type 304 stainless steel corrosion potential values measured at the same level of oxygen. Further increase of the oxygen concentration increased the corrosion potential of the YSZ-coated electrodes.

After the system was left in 288° C. water containing various water chemistry conditions for 3 months, the corrosion potential was again measured by increasing the oxygen concentration (see FIG. 14). This data indicates that the corrosion potential behavior of the YSZ-coated electrodes was retained for extended periods.

From the foregoing data, it is apparent that the application of a YSZ coating on the surface of Type 304 stainless steel appears is advantageous in maintaining a low corrosion potential ($<-0.5$ $V_{she}$) at high oxygen levels (up to about 300 ppb), even in the absence of hydrogen, by reducing mass transfer of oxygen to the metal surface and thereby mitigating SCC of the structural material. Since the oxygen concentration during operation of a BWR is about 200 ppb, SCC in BWR structural components could be mitigated by the application of a YSZ coating or any other electrically insulating protective coating on the surfaces of the structural material.

The foregoing method has been disclosed for the purpose of illustration. Variations and modifications of the disclosed method will be readily apparent to practitioners skilled in the art of water chemistry. All such variations and modifications are intended to be encompassed by the claims set forth hereinafter.

We claim:

1. A method for mitigating growth of a crack in a surface of a metal component in a water-cooled nuclear reactor or associated equipment, said uncoated surface of said metal component being susceptible to stress corrosion cracking in high-temperature water, comprising the step of applying a coating on said surface of said metal component, said coating comprising electrically insulating material having restricted mass transport crevices which penetrate to said surface of said metal component and which restrict the flow of oxidants to said surface, whereby the corrosion potential of said surface of said metal component is decreased to a level below a critical potential at which stress corrosion cracking occurs.

2. The method as defined in claim 1, wherein said electrically insulating material comprises zirconia.

3. The method as defined in claim 2, wherein said coating further comprises zinc oxide.

4. The method as defined in claim 1, wherein said electrically insulating material comprises yttria stabilized zirconia.

5. The method as defined in claim 1, wherein said electrically insulating material comprises alumina.

6. The method as defined in claim 5, wherein said coating further comprises zinc oxide.

7. The method as defined in claim 1, wherein said hydrogen is not added to the feedwater of said reactor during reactor operation.

8. The method as defined in claim 1, wherein said metal component is made of stainless steel or other reactor structural material.

9. The method as defined in claim 1, wherein said electrically insulating material comprises particles sprayed onto said surface of said metal component.

10. A component of a water-cooled nuclear reactor or associated equipment comprising:
 a metal substrate having a surface which is susceptible to stress corrosion cracking in high-temperature water when left untreated; and
 a coating on said surface of said metal substrate, said coating comprising electrically insulating material having restricted mass transport crevices which penetrate to said surface of said metal component and which restrict the flow of oxidants to said surface, whereby the corrosion potential of said surface of said metal component is decreased to a level below a critical potential at which stress corrosion cracking occurs.

11. The component as defined in claim 10, wherein said electrically insulating material comprises zirconia.

12. The component as defined in claim 11, wherein said zirconia is stabilized with yttria.

13. The component as defined in claim 10, wherein said electrically insulating material comprises alumina.

14. The component as defined in claim 10, wherein said metal component is made of stainless steel or other reactor structural material.

15. The component as defined in claim 10, wherein said coating further comprises zinc oxide.

16. The component as defined in claim 10, wherein said electrically insulating material comprises particles sprayed onto said surface of said metal component.

17. A water-cooled nuclear reactor comprising metal components which are susceptible to stress corrosion cracking during reactor operation and which have been treated to mitigate said stress corrosion cracking, each of said metal components comprising:
 a metal substrate having a surface which is susceptible to stress corrosion cracking in high-temperature water when left untreated; and
 a coating on said surface of said metal substrate, said coating comprising electrically insulating material having restricted mass transport crevices which penetrate to said surface of said metal component and which restrict the flow of oxidants to said surface, whereby the corrosion potential of said surface of said metal component is decreased to a level below a critical potential at which stress corrosion cracking occurs.

18. The nuclear reactor as defined in claim 17, wherein said electrically insulating material comprises zirconia.

19. The nuclear reactor as defined in claim 18, wherein said zirconia is stabilized with yttria.

20. The nuclear reactor as defined in claim 17, wherein said electrically insulating material comprises alumina.

* * * * *